US005128837A

United States Patent [19]
Hiesinger

[11] Patent Number: 5,128,837
[45] Date of Patent: Jul. 7, 1992

[54] LIGHT PROJECTOR FOR USE IN PHOTOGRAPHY

[75] Inventor: Reinhard Hiesinger, Ottobeuren, Fed. Rep. of Germany

[73] Assignee: Firma Novoflex Fotogeratebau Karl Muller, Memmingen, Fed. Rep. of Germany

[21] Appl. No.: 759,926

[22] Filed: Sep. 13, 1991

[30] Foreign Application Priority Data

Sep. 29, 1990 [DE] Fed. Rep. of Germany ....... 4030865

[51] Int. Cl.$^5$ ............................................. G03B 15/02
[52] U.S. Cl. .................................... 362/12; 362/13; 362/32; 362/228
[58] Field of Search ................. 362/7, 12, 13, 14, 228, 362/236, 243, 32

[56] References Cited

U.S. PATENT DOCUMENTS 2,642,518  6/1953  Bates ................................. 362/12 X
4,847,645  7/1989  Kallenberg et al. ............... 362/12 X Primary Examiner—Stephen F. Husar
Attorney, Agent, or Firm—Fleit, Jacobson, Cohn, Price, Holman & Stern

[57] ABSTRACT

A projector for use in photography comprises a housing containing a first light source, which provides focusing light. A pivotable mirror can be pivoted into the beam path. A flash light device or the like attached to the outside of the housing as second light source illuminates the object via the mirror during exposure. Any flash light device of conventional type can be used as external light source.

9 Claims, 1 Drawing Sheet

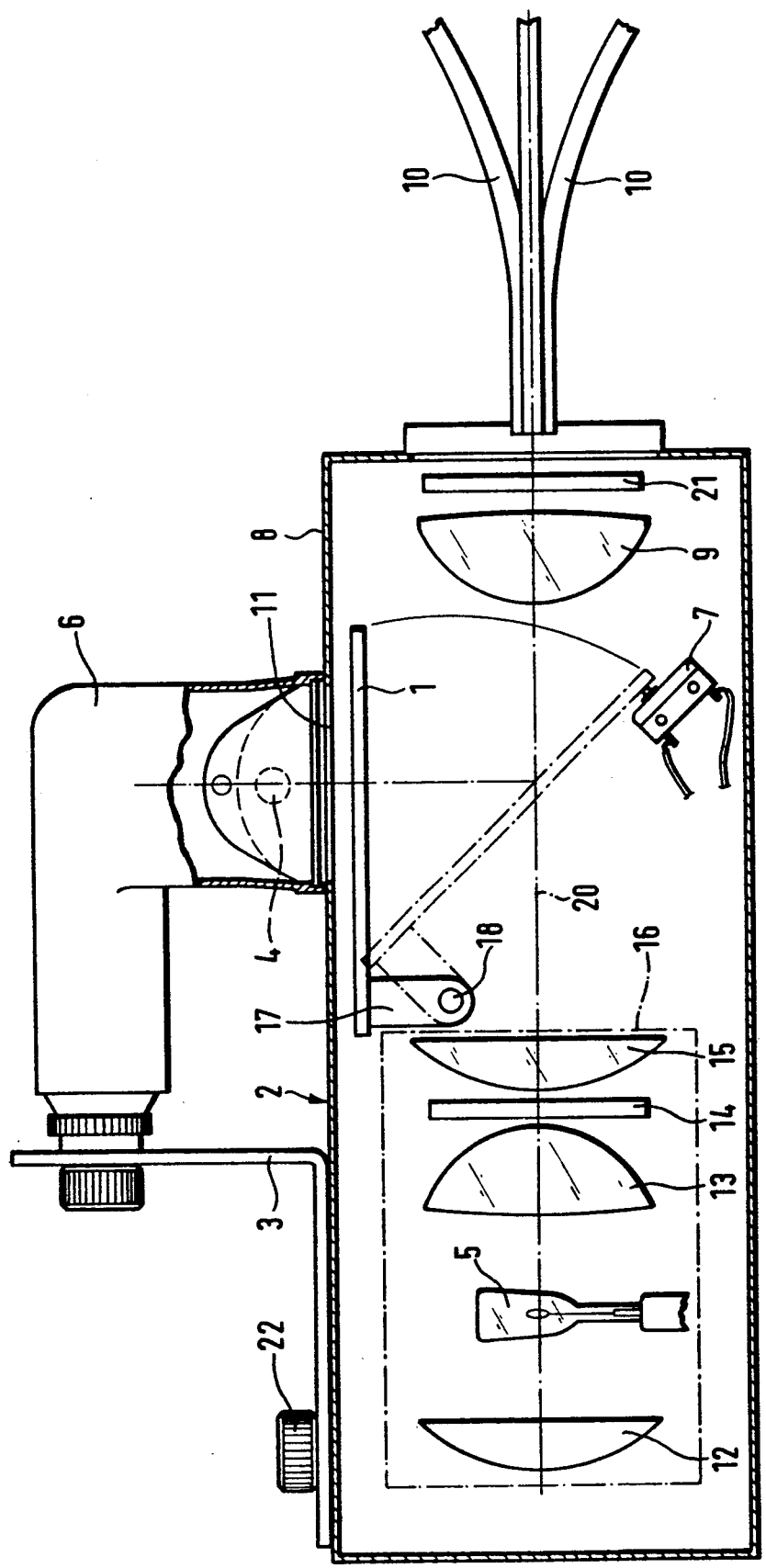

LIGHT PROJECTOR FOR USE IN PHOTOGRAPHY

TECHNICAL FIELD OF THE INVENTION

The invention relates to a light projector for use in photography, consisting of a housing with a first light source for illuminating the object before exposure to enable focusing, and a flash light arrangement or the like as second light source for use during exposure.

BACKGROUND TO THE INVENTION

Light projectors for use in photography, including cold light projectors, are known in which a first light source is disposed in a housing and serves to illuminate the object to be exposed via light guides. Mirrors, lenses, filters etc. are disposed between this first light source, which may for example be a halogen lamp, and the light guides.

For the exposure, known light projectors of this type can be switched over to a second light source in the form of a flash light device, so that during exposure the object is illuminated by the second light source, i.e. the flash light.

These known devices are relatively costly.

The object of the invention is to provide a light projector which possesses substantially the same properties as known light projectors, but which is substantially cheaper to produce.

BRIEF SUMMARY OF THE INVENTION

In order to achieve this object, the invention is based on a light projector of the type generally indicated above. According to the invention, a mirror is angularly disposed in the beam path of the first light source, and on the projector housing securing means are provided for the attachment of a second, external light source, the light from this external light source being introduced via the mirror into the beam path of the first light source In the light projector according to the invention, a separate device is used as second light source, e.g. a flash light or a special form of light source, such as for example an infra-red light source, which separate device the user would as a general rule already possess. This device is attached to the outside of the housing when it is to be used in conjunction with the light projector. However, the second light source can also be separated from the housing and can be used separately in conjunction with, for example, a camera. In this manner, the invention achieves an improved utilization of an existing flash gun or the second light source.

DETAILED DESCRIPTION OF THE INVENTION

The mirror employed in the invention may be a partially transparent mirror. In this case, the mirror could be fixedly disposed in the beam path. However, it is preferred that the mirror be a pivotable mirror which is pivoted into the beam path of the light from the first light source only for the illumination by the second light source, e.g. for flash light.

In this case, the pivotable mirror can be used to occlude the beam path of the first light source. Moreover, it is possible if desired to allow the pivotable mirror to act on a switch, whereby, for example, the first light source is deactivated.

The housing according to the invention preferably has a box-type construction, and the securing means for securing the second light source are disposed on the upper surface of the housing. This gives the advantage that the securing means have essentially to secure only the position of the flash gun or the like, while the latter rests on the housing.

The securing means for securing the flash gun or the like can consist, for example, of an angle bracket which can be screwed onto the housing. When not in use, the angle bracket can be demounted, in order to reduce the dimensions of the projector.

A converging lens is preferably disposed in the beam path behind the mirror, which converging lens concentrates the light into the diameter of the light guide or light guides which serve to illuminate the object.

Preferably also, an opening for the second light source is disposed on the upper surface of the housing.

Since, in the invention, the housing of the light projector contains essentially only the first light source, it is possible to use a commercially available projector for this first light source (including the associated components, i.e. mirrors, lenses, filters etc., which are required to direct the light rays). Such commercially available projectors, which are employed, for example, as projectors for slides, are produced in large numbers and are relatively cheap. In the present invention, such a projector can be inserted into a housing, or the parts of such a projector may used, whereby the production cost of the light projector according to the invention may be greatly reduced. In general the projector used in the invention is preferably a cold light projector, and, most preferably, a halogen lamp serves as the first light source.

BRIEF DESCRIPTION OF THE DRAWINGS

FIG. 1 is a schematic side view of a light projector according to the invention.

DESCRIPTION OF PREFERRED EMBODIMENTS

Referring to the drawing, a housing 2 has a generally cubic form. The housing 2 receives the elements of a commercially available cold light projector. These elements are connected to one another as a sub-unit, as is indicated by the dot-dashed lines 16. The cold light projector consists essentially of a halogen light source 5, a concave mirror 12, a converging lens 13, a heat protection filter 14 and a condenser lens 15.

A flash unit 6 including a second light source 4 is secured on the upper surface 8 of the housing 2, by an angle bracket 3. The angle bracket 3 has two openings. One of the openings serves, by means of a screw 22, to secure the angle bracket to the housing 2. The flash unit 6 is screwed into the other opening. An opening 11 for light from the flash unit 6 is provided in the housing 2.

A pivotable mirror 1 can be pivoted into the beam path extending from the halogen lamp 5. This pivotable mirror is carried by a bracket 17, which is pivotable about a shaft 18. If the first light source 5 is to be used, the pivotable mirror 1 is situated in the swung-up position. If, on the other hand, the second light source 4, i.e. the flash unit 6, is to be used, the pivotable mirror is swung down. An actuating lever is expediently disposed outside the housing 2, for this purpose.

In the swung-down position of the pivotable mirror, the latter cooperates with a microswitch 7, which causes the first light source 5 to be deactivated.

In the operating position, the mirror 1 is disposed at an angle of 45 degrees to the optical axis 20, so that the light of the second light source 4 is injected directly into the beam path of the first light source. The light then passes via a converging lens 9 and a filter 21 to light guides 10, which are preferably bundles of glass fibers.

The filter 21 can serve for polarisation, or may be a UV filter or a color filter.

Instead of a flash light source, the second light source 4, disposed externally, may be a special light source, for example an infra-red light source.

A particular advantage of the invention is that the flash gun, i.e. the second light source 4, can easily be connected to the camera by a connecting cable, so that flash TTL control is possible. Synchronisation of the camera with the flash light device is thus not impaired.

I claim:

1. A light projector for use in photography, comprising
   a housing;
   a first light source within said housing for illuminating an object before exposure to enable focusing;
   a mirror angularly disposed in the beam path of said first light source; and
   securing means provided on said housing for the attachment of a second external light source such that light from the second external light source can be introduced via said mirror into the beam path of said first light source.

2. A projector as claimed in claim 1, wherein said mirror is a pivotable mirror which is pivoted into the path of light from said first light source only for illumination by the second light source.

3. A projector as claimed in claim 2, wherein said pivotable mirror in its operating position occludes the path of light from said first light source.

4. A projector as claimed in claim 2, wherein said pivotable mirror cooperates with a switch to deactivate said first light source.

5. A projector as claimed in claim 1, wherein said housing has a generally box-like construction and said securing means are disposed on the upper surface of said housing.

6. A projector as claimed in claim 1, wherein said securing means comprises an angle bracket, which can be screwed onto said housing.

7. A projector as claimed in claim 1, wherein a converging lens is disposed in the beam path behind said mirror, which converging lens concentrates the light into the diameter of a light guide or light guides which serve to illuminate the object.

8. A projector as claimed in claim 1 provided with an opening at an upper surface of said housing to permit entry of light from the second light source to the housing.

9. A projector as claimed in claim 1, wherein said first light source and associated elements form part of a commercially available projector.

* * * * *